(12) United States Patent
Chi et al.

(10) Patent No.: US 7,403,328 B2
(45) Date of Patent: Jul. 22, 2008

(54) SOLAR-PUMPED LASER

(75) Inventors: Sien Chi, Hsinchu (TW); Nan-Kuang Chen, Hsinchu (TW); Jow-Tsong Shy, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 11/488,686

(22) Filed: Jul. 19, 2006

(65) Prior Publication Data
US 2007/0188850 A1  Aug. 16, 2007

Related U.S. Application Data

(62) Division of application No. 10/920,340, filed on Aug. 18, 2004.

(51) Int. Cl.
*H01S 3/09* (2006.01)

(52) U.S. Cl. .................................... 359/341.3

(58) Field of Classification Search ............ 372/6; 359/333, 341.3
See application file for complete search history.

(56) References Cited

U.S. PATENT DOCUMENTS 4,743,083 A * 5/1988 Schimpe ................. 385/37
2002/0117675 A1 * 8/2002 Mascarenhas ............ 257/87
2005/0053112 A1 * 3/2005 Shams-Zadeh-Amiri ..... 372/96

FOREIGN PATENT DOCUMENTS

JP    62029190 A  *  2/1987

OTHER PUBLICATIONS

Research Activities of Millilab 1999-2000. Millmetre Wave Laboratory of Finland. Joint Laboratory between VTT and Helsinki University of Technology.*
ElSherbiny et al. Holographic Antenna Concept, Analysis, and Parameters. IEEE Transactions on Antennas and Propagation. vol. 52. No. 3. Mar. 2004.*

* cited by examiner

*Primary Examiner*—Deandra M Hughes
(74) *Attorney, Agent, or Firm*—Troxell Law Office, PLLC

(57) ABSTRACT

The present invention provides a solar-pumped active device which utilizes a holographic antenna grating on a solar energy silicon substrate to select specific diffracted wavelength and couple pump wavelength in an approximately vertical way and converge the pump wavelength to excite an optical gain medium so that an optical amplifier or a laser can be obtained. The present invention requires no big size and is flexible over the surface shape and is suitable for free space optical communications on the ground and satellite optical communications. It means that the holographic antenna grating can be applied on the top floor of a building or on the glass surface of an outer wall. If it is applied to a satellite, the present invention can be deposited on a solar energy cell substrate to form a high optical amplification so that not only the electricity required in satellite optical communications can be reduced, but also a high-speed and large capacity of data can be transferred between satellites.

29 Claims, 12 Drawing Sheets

SOLAR-PUMPED LASER

RELATED APPLICATIONS

This application is a Division of currently pending application U.S. Ser. No. 10/920,340, entitled "SOLAR-PUMPED ACTIVE DEVICE, and filed on Aug. 18, 2004.

FIELD OF THE INVENTION

The present invention relates to a solar-pumped active device. More particularly, the present invention relates to an active device using a holographic antenna grating on a solar energy silicon substrate to couple the required specific pump wavelength in sun light in an approximately vertical direction to generate a laser. Or, in the active device, the spared pump wavelength propagated through the solar energy silicon substrate is diffracted into an optical gain medium again to be amplified by using a reflection layer.

DESCRIPTION OF THE RELATED ART

The erbium-doped (Er-doped) fiber amplifier (EDFA) generally excites a 10-meter Er-doped fiber with a laser of 980 nm (nanometer) wavelength to produce a light amplification gain of 20 dB (decibel) to 30 dB during 1530 nm to 1560 nm. Nevertheless, about one ampere current is constantly consumed on driving the semiconductor laser and the cooling chip for temperature control, not to mention that a pump wavelength of 1480 nm would consume more electricity. This would bottlenecks the applications of the optical communications in some special environments, such as the satellite, the mountain, the desert, the South Pole, or the North Pole, where electricity is hard to obtain. To generate electricity by solar energy is now widely welcomed and assiduously developed in many countries due to its harmlessness to the environment and resource of the earth. Similar effort has been made on converging sunlight to excite optical gain medium for producing a laser having high energy of tens of watts, which was made successful in the laboratory decades ago and is one of the subjects for the scientists to study continuously. However, large-scale focusing lens are used in most of the conventional methods to collect sufficient pump wavelength needed in sunlight for obtaining larger gain. With such a structure, solar-pumped laser or optical amplifier are only suitable in use of studies inside laboratories by few scientists. Therefore, this structure is not generally suitable for commercial products, not to mention it is a too big device to be installed on an artificial satellite or in an international space station. Yet, in order to meet the demand on the transmission of great amount of data or images in a short time for meteorological or military satellites, the satellite optical communication is one of the significant items assiduously developed nowadays by those countries with advanced technologies. The wireless optical communication is of no doubt the best choice for high speed data transmission between a satellite and another satellite or even between a satellite and a ground station. In addition, the high directionality of a laser also provides the communication with high confidentiality. And, so, the satellite optical communication is also one of the significant items being developed by the defense authorities of all countries. Therefore, in order to realize the idea of wireless optical communications for the artificial satellites, a solar power amplifier in a small size but with high convert efficiency is becoming one of the necessary and important devices.

Conventionally, a laser with high gain and high output power (up to 18 watts) can be obtained by pumping the sunlight. However, the sunlight is almost always focused by a large-scale parabolic lens or by using focusing methods of non-imaging optics, which makes the structure of the whole laboratory seem quite huge and diminish the practicability. Furthermore, because almost all of the sunlight is focused onto the optical gain medium, the optical gain medium has to be cooled down by cooling water simultaneously to prevent the lens from over-heating. As illustrated above, in the future, the main factor for whether the solar power optical amplifier and the laser would be successfully practicable lies on the use of a focusing method which is characterized in selective wavelengths and the small size of the device.

In the prior art, a holographic grating is added into the structure of the optical waveguide so that the transmission energy in the optical waveguide can be coupled in an almost vertical direction to be irradiated and to form a focusing effect like a Fresnel lens. And, according to the principle of the reversibility of the optical path, if a parallel beam is vertically impinged to the optical waveguide grating, the beam will be coupled into the optical waveguide and will be focused at the focal point, which is known as a holographic antenna grating. The maximum diffraction efficiency of such a grating for a specific wavelength is about 40 percent. And a reflection layer can be simply deposited under the grating to reflect the spared pump light to the diffraction grating for increasing its diffraction efficiency. However, the grating is only used to couple the signal light in the optical waveguide to be irradiated, or to couple external signal light to the optical waveguide to be transferred, wherein no collector of a large-facet holographic antenna grating is proposed to collect specific wavelength from sunlight for being coupled to an optical gain medium to form a laser.

Now, the holographic antenna grating is used to couple the external pump light to be transferred in an almost vertical direction into the optical waveguide which comprises an optical gain medium at the bottom; and so an optical amplifier is obtained. Therein, however, no fabrication of a large-facet coupling device for specific sunlight wavelength is proposed, neither is proposed a fabrication of a complete round-shaped holographic grating which can converge pump wavelength into the grating center to collect mass energy to excite optical gain medium for obtaining a laser and for optical amplification. Moreover, the way for obtaining the optical signal gain is by the effect of the evanescent field, whose excite effect is not as effective as the present invention owing to that the evanescent field can directly couple the pump light into a high-doped Er waveguide to obtain a strong overlapping among the signal light, the pump light and the optical gain medium.

SUMMARY OF THE INVENTION

Therefore, the main purpose of the present invention is to couple required pump wavelength in sunlight in an almost vertical direction by a holographic antenna grating, wherein the wavelength is transferred horizontally and converged at the optical gain medium to be excited by the pump wavelength for obtaining a laser.

Another purpose of the present invention is to substantially improve the vertical-oriented diffraction efficiency; and, by using a reflection layer, the spared pump wavelength propagated through the solar energy silicon substrate can be diffracted into an optical gain medium again to be amplified and so to improve the diffraction efficiency.

A further purpose of the present invention is to provide a solar energy pump light amplifier which needs no electricity and is suitable for special environments, such as the artificial satellite, the international space station, the adventure station for external celestial bodies, the international long-distance air route airplanes, the mountains, the deserts, the South Pole and the North Pole, etc. If the present invention is equipped with a backup solar cell, the present invention can be used as a signal amplification device in optical communications to save energy in usage. But, while the present invention is used on the ground, it is better to be used in the areas with dry climate, such as the continental areas or the desert areas, though the dust storm seasons are exceptions; and it is suitable to be deposited on the top of an enterprise building.

The last purpose of the present invention is to meet the demand on electricity for the optical amplifiers in the optical communications.

To achieve the above purposes, the present invention is a solar-pumped active device which comprises a solar energy silicon substrate with a holographic antenna grating, wherein an optical waveguide is at the center of the grating. By the grating, the required pump wavelength in sunlight is coupled in an almost vertical direction and then is transferred horizontally and converged at the optical gain medium to be excited by the pump wavelength for substantially improving the diffraction efficiency. An optical gain medium is at the center of the optical waveguide. A reflection layer is on the solar energy silicon substrate, by which the spared pump wavelength propagated through the solar energy silicon substrate is diffracted into an optical gain medium again for improving the total diffraction efficiency. The present invention meets the demand on electricity for the optical amplifiers in the optical communications and is suitable for special environments, such as the artificial satellite, the international space station, the adventure station for external celestial bodies, the international long-distance air route airplanes, the mountains, the deserts, the South Pole, the North Pole, etc. If a backup solar cell is equipped with the present invention in usage, it can be used as a signal amplification device in optical communications to save energy. But, while the present invention is in use on the ground, it is better to be used in the areas with dry climate, such as the continental areas or the desert areas, though the dust storm seasons are exceptions. And the present invention is suitable to be deposited on the top of an enterprise building.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
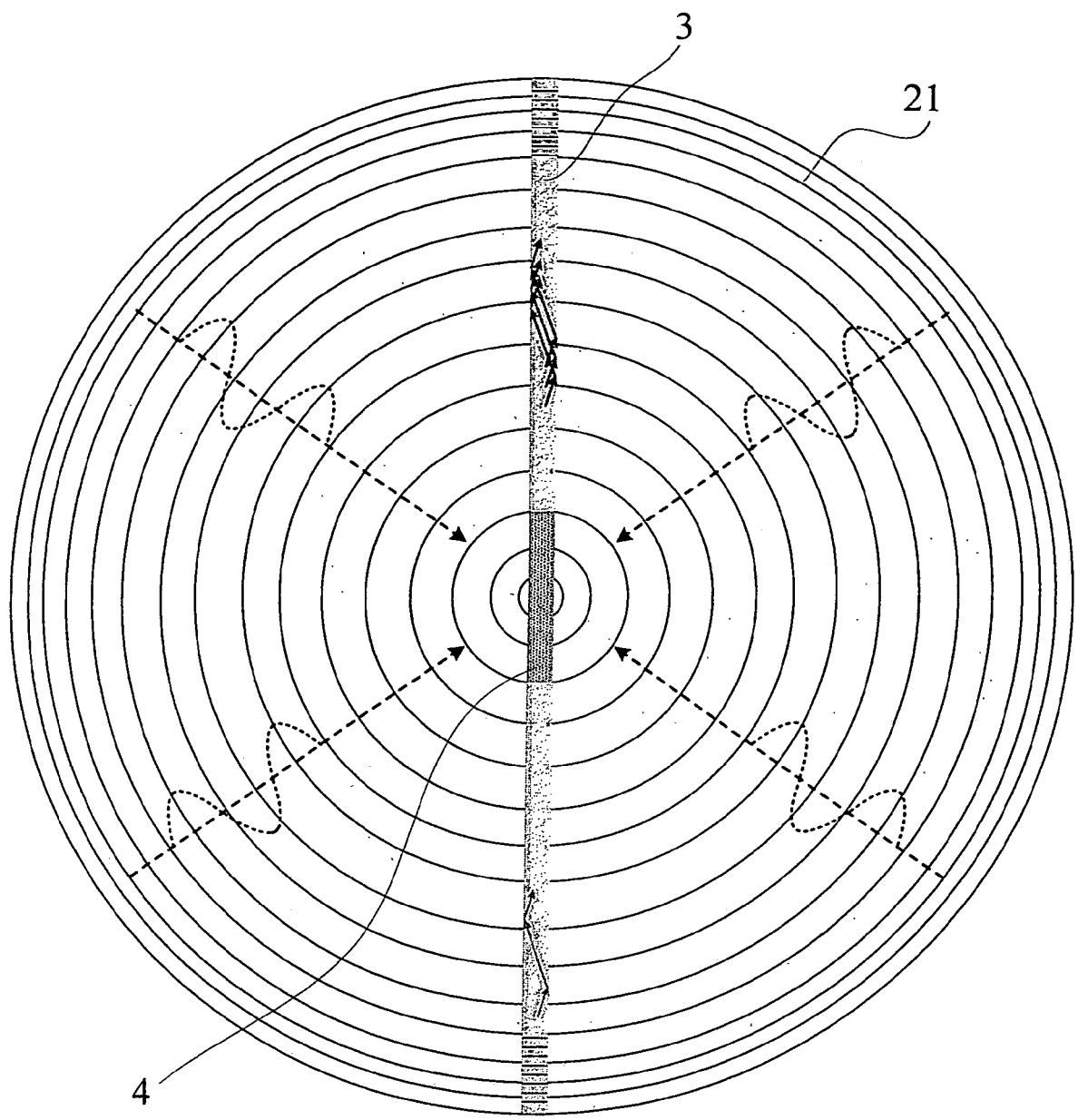
FIG. 1 is a vertical view of the operation principle of the optical amplifier according to the present invention.
Figure 2:
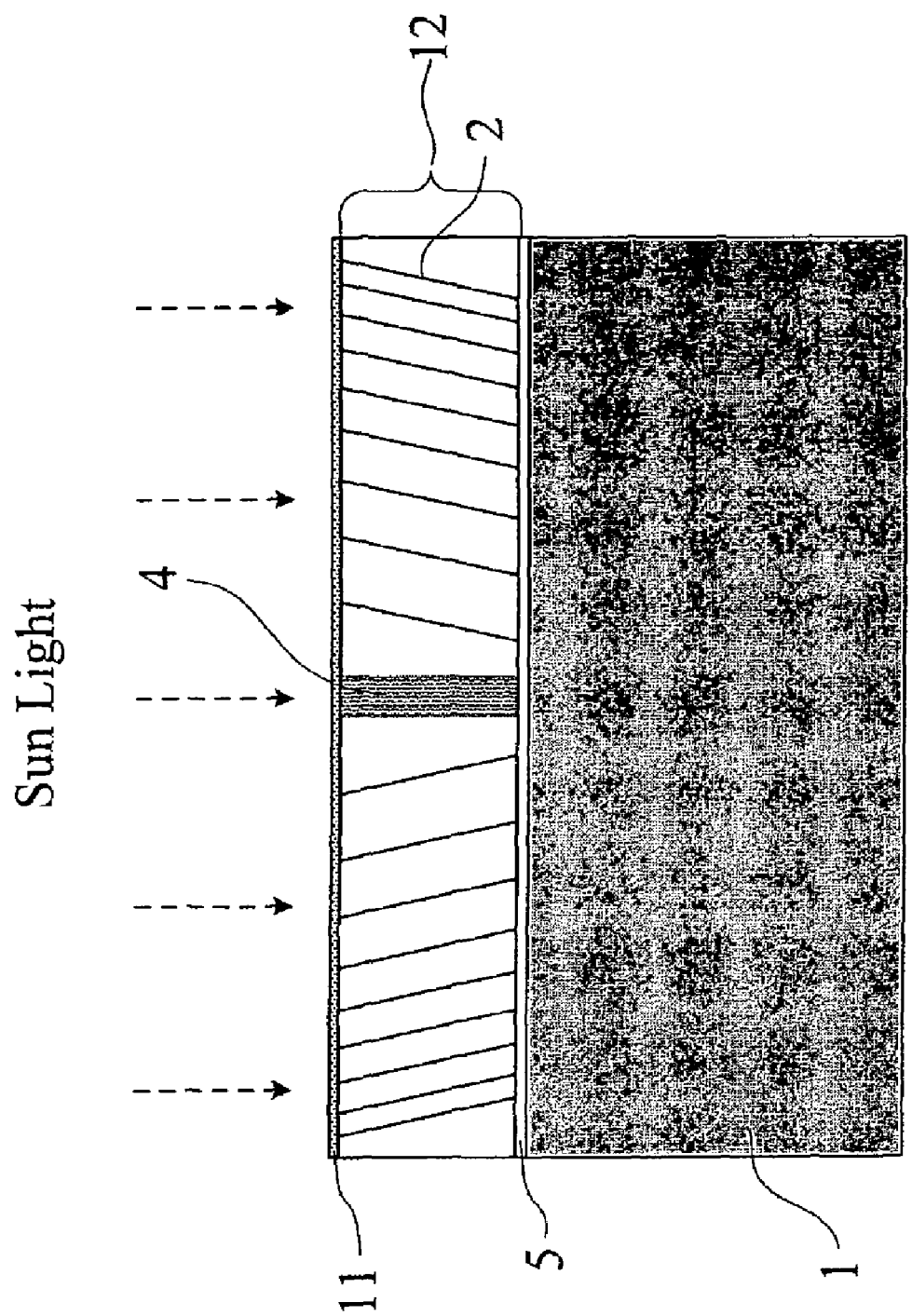
FIG. 2 is a side view of the optical amplifier according to the present invention.
Figure 3:
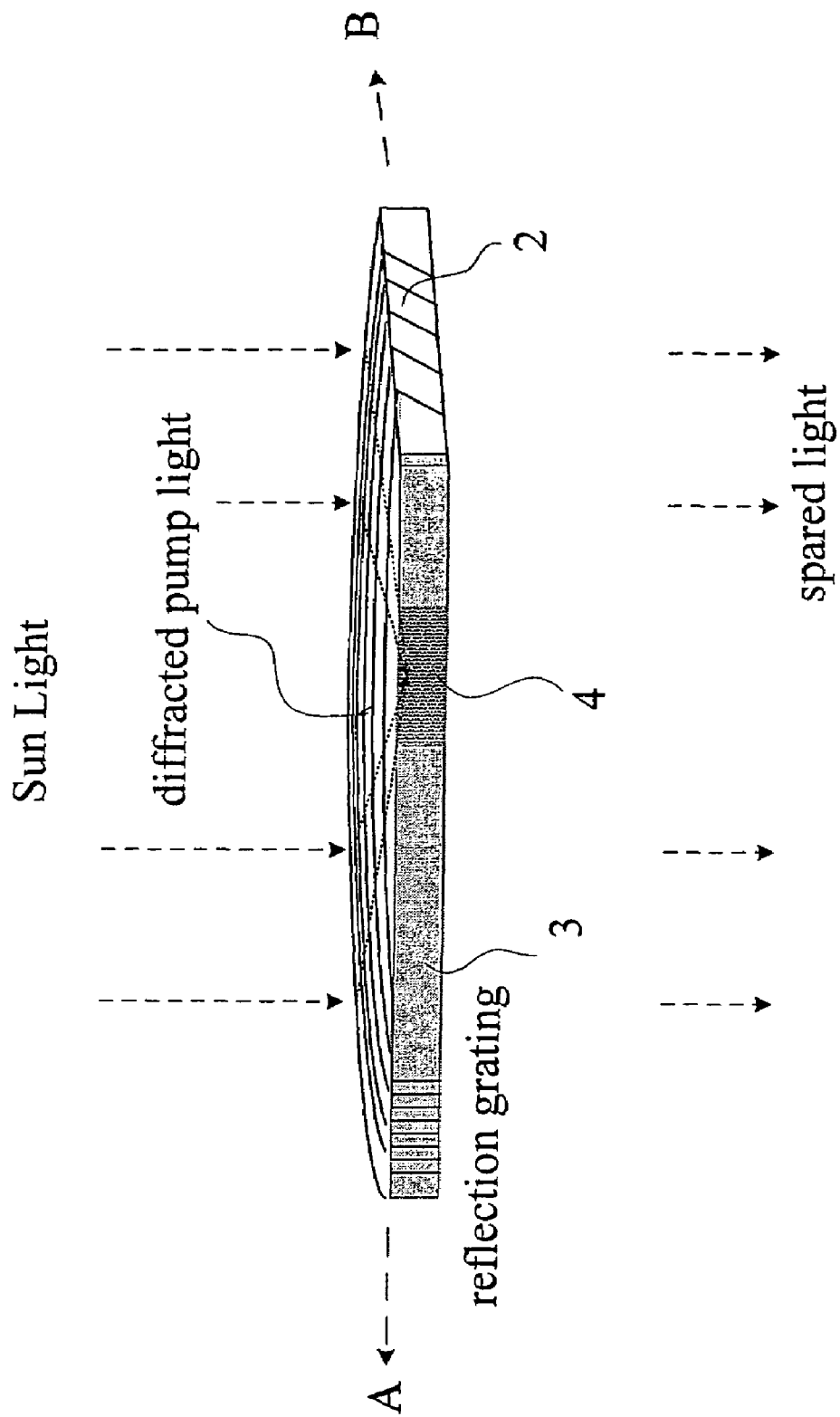
FIG. 3 is a cross-section view of the optical amplifier according to the present invention.

Please refer to FIG. 1 through FIG. 3, which are a vertical view of the operation principle, a side view, and a cross-sectional view, of the optical amplifier according to the present invention. As shown in the figures, the present invention is a solar-pumped active device which comprises a solar energy silicon substrate 1, an optical diffraction element 21, a first optical reflection element 22, an optical waveguide 3, an anti-reflection film 11, an optical gain medium 4, an input port 61, an output port 62 and a reflection layer 5.

Therein, on the solar energy silicon substrate 1 are a reflection layer 5 with a waveguide layer 12 which comprises an optical diffraction element 21; an optical waveguide 3; an optical gain medium 4; and an anti-reflection film 11. The required wavelength is coupled by the optical diffraction element 21 of the waveguide layer 12 and the first optical reflection element 22 of the optical waveguide 3; and then it is converged to the optical gain medium 4 so that the signal launched into the input port 61 is then amplified and transmitted through the output port 62. Accordingly, an amplifier is obtained.

The solar energy silicon substrate 1 can further be a substrate covered with a silicon dioxide waveguide layer 12 having a thickness of around several optical wavelengths. An optical diffraction element 21 is on the solar energy silicon substrate 1, which element can be a holographic antenna grating or a photonic crystal in a surface-relief type or an index-modulation type made into a large facet for collecting sufficient sunlight. An optical waveguide 3 is at the center of the present invention. An optical gain medium 4 is at the center of the optical waveguide 3, which medium can be a highly-doped erbium (Er) glass, an ytterbium-doped (Yb-doped) glass, an Er/Yb co-doped glass, or a glass of a rare earth element. The Er-doped glass is radiation-hardened to prevent from the solarization effect. A first optical reflection element 22 is on both sides of the optical gain medium 4, which element can be a reflection grating, a Bragg grating, or a reflection grating for pump wavelength. A reflection layer 5 and an anti-reflection film 11 are covered on the solar energy silicon substrate 1 to improve the light absorption efficiency. The required pump wavelength in sunlight is coupled in an almost vertical direction by the optical diffraction element 21, which wavelength is transferred horizontally and then converged at the optical gain medium to be excited by the pump wavelength. The spared pump wavelength propagated through the solar energy silicon substrate 1 is diffracted into the optical gain medium 4 again by the reflection layer 5 so that the signal launched into the input port 61 is then amplified and transmitted through the output port. Accordingly, an amplifier is obtained.

Figure 4:
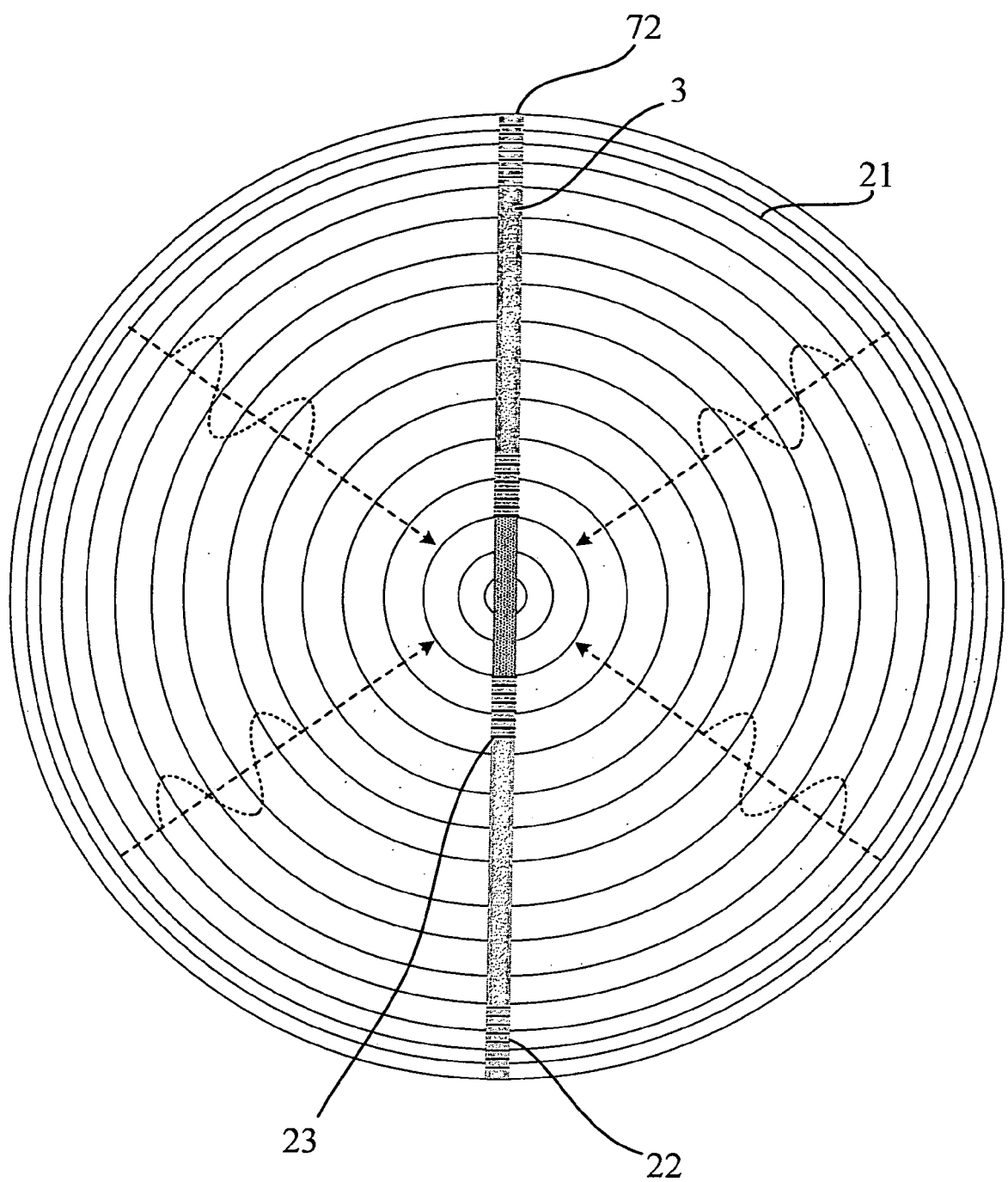
FIG. 4 is a vertical view of the operation principle of the laser according to the present invention.

Please refer to FIG. 4, which is a vertical view of the operation principle of the laser according to the present invention. Here, the present invention at least comprises a solar energy silicon substrate 1, an optical diffraction element 21, a first optical reflection element 22, a second optical reflection element 23, an optical gain medium 4, an output port 72, an anti-reflection film 5 and a reflection layer 11.

Therein, the solar energy silicon substrate 1 is covered with a reflection layer 5 and a silicon dioxide layer 12, and on the substrate 1 are an optical diffraction element 21, an optical gain medium 4, and an anti-reflection film 11. The required pump wavelength is coupled into the optical waveguide 3 by the optical diffraction element 21 and is confined to propagate along the optical waveguide 3 back and forth by the first optical reflection element 22; and then, it repeatedly excites the optical gain medium 4 to obtain a laser in coordination with the second optical reflection element 23; and then, it is transmitted through the output port 72.

The solar energy silicon substrate 1 can further be a substrate covered with a silicon dioxide waveguide layer 12 having a thickness of about several microns. An optical diffraction element 21 is on the solar energy silicon substrate 1, which element can be a holographic antenna grating in a surface-relief type or an index-modulation type or a photonic crystal made into a large facet for collecting sufficient sunlight. An optical waveguide 3 is at the center of the present invention. An optical gain medium 4 is at the center of the optical waveguide 3, which medium can be a highly-doped Er glass, an Yb-doped glass, an Er/Yb co-doped glass, or a glass of a rare earth element. The Er-doped glass is radiation-hardened to prevent from solarization effect. A first optical reflection element 22 is on both sides of the optical gain medium 4, which element can be a reflection grating, a Bragg grating, or a reflection grating for pump wavelength. A reflection layer 5 and an anti-reflection film 11 are on the solar energy silicon substrate 1 to improve light absorption efficiency. The required pump wavelength in sunlight is coupled in an almost vertical direction by the optical diffraction element 21, which wavelength is transferred horizontally and then is converged at the optical gain medium 4 to be excited by the pump wavelength. The spared pump wavelength propagated through the silicon dioxide waveguide layer 12 is diffracted into the optical gain medium 4 again by the reflection layer 5. And, by coordinating with the second optical reflection element 23 on both sides of the optical gain medium 4, a laser is obtained and is outputted by the output port 72. The second optical reflection element 23 can be a reflection grating for lasing wavelength.

Therein, the optical diffraction element 21 can further be substituted with a photonic crystal to achieve the effect of the present invention. The vertical diffraction efficiency of the photonic crystal is higher so that the holographic antenna grating of the present invention can be substituted with a photonic crystal; yet, the reflection grating for pump wavelength and the reflection grating for lasing wavelength are reflecting the specific wavelength by the photonic band gap of the photonic crystal, wherein the operation is not the same as the reflection done by the photonic crystal that substitutes the holographic antenna grating.

And, further by the characteristic of the dispersion of the optical gain medium 4 and the different characteristics of the silicon dioxide layer near by, the present invention can obtain a laser or an amplifier for S band or another band of light. If the optical gain medium 4 is Er-doped or Er/Yb-doped and the optical gain medium 4 is boron-doped and the holographic silicon dioxide grating layer is fluorine-doped, a laser and an amplifier for S band of light can be made according to the characteristic of the dispersion of the material or according to the characteristic of the higher material dispersion slope of the optical gain medium 4 than that of the silicon dioxide layer 12, no matter what material is doped into the optical gain medium 4 or the silicon dioxide layer 12. Accordingly, a laser and an amplifier for C band of light with shorter wavelength are obtained. Besides, if the optical gain medium 4 is Er-doped or Er/Yb-doped, it can be further doped with aluminum; and, if doped with a rare earth element, further boron-doped or germanium-doped. And, the silicon dioxide can further be substituted by a polymer. Because no electricity is in need in the present invention, the substrate 1 of the present invention can be made of another metal or a polymer or a dielectric material. The shape of the holographic antenna grating is not limited to be a circle; it can further be an ellipse or any other geometric shape. The host material for the optical gain medium 4 can be a phosphate glass, a fluorophosphates glass, a silicate glass, or a borate glass.

The present invention can be applied in many environments, such as the optical communications between satellites, the optical fiber communications, the wireless optical communications, etc., and can solve the problem of the electricity needed by the optical amplifier in the optical communications nowadays, wherein a solar-pumped optical amplifier required no electricity is obtained that can be used in special environments, such as the artificial satellites, the international space stations, the adventuring stations of external celestial bodies, the international long-distance air route airplanes, the mountains, the deserts, the South Pole and the North Pole. If the present invention is equipped with a backup solar cell in usage, it can be used as a signal amplification device in the optical communications to saves energy. But, while the present invention is used on the ground, it is better to be used in areas of dry climate, such as the continental areas or the desert areas, wherein dust storm seasons are exceptions; and it is suitable to be deposited on the top of an enterprise building. In short, the present invention is suitable for all applications of solar energy silicon substrate 1 (solar energy cells).

The holographic antenna grating which is capable of selecting wavelength can couple the almost vertically impinged pump wavelength in the spectrum of sunlight to become a pump wavelength propagating in a horizontal direction. The benefit is that, by using the waveguide layer 12 on the solar energy silicon substrate 1, the 980 nm (nanometer) or 1480 nm pump wavelength in sunlight can be coupled vertically into the waveguide layer 11. And then the pump wavelength is converged to the center of the holographic antenna grating 21 to enter into the Er-doped glass of the optical waveguide 3, so that the erbium ions are excited by a pump wavelength power to obtain the effect of optical amplification. By further coordinating with a reflection grating for lasing wavelength, a laser can be obtained. Therein, only the wavelength in the holographic antenna grating 2 which is diffracted around 980 nm or 1480 nm enters into the optical waveguide 3; and, the main light absorption band (550 nm to 750 nm) of the solar energy silicon substrate 1 (solar energy cell) for generating electricity will not be affected. Therefore, the advantage of the present invention is that the optical communication can be achieved by simply applying a waveguide layer 11 on the solar energy silicon substrate 1 which formerly has a large facet and by fabricating a holographic antenna grating 2 of large facet thereon, while there is no influence on generating electricity by the solar energy silicon substrate 1 (solar energy cell). However, a critical defect of the holographic antenna grating 2 is that, theoretically, its maximum diffraction efficiency is only 40 percent. In another word, only 40 percent of 980 nm wavelength in sunlight can be coupled and be transferred horizontally to enter into the optical waveguide 3 at the center, and the other 60 percent of wavelength will propagate to the solar energy silicon substrate 1 (solar energy cell) at the bottom. According to the experimental results of the present invention, the diffraction efficiency is estimated to be around 30 percent, but it can still form a pump energy greater than 200 mW (milliwatt) on a square-shaped diffraction plate with a facet of 30 cm×30 cm. Concerning the diffraction efficiency, by simply adding a 980 nm refection layer 5 under the holographic antenna grating 2. The spared pump wavelength propagate through the silicon dioxide waveguide layer 12 can be reflected back to the holographic antenna grating 2, followed by transferring to the waveguide layer 12 and propagating into the optical gain medium 4 to obtain an amplifier. Thereby, the diffraction efficiency of the holographic antenna grating 2 can be improved indirectly.

Figure 5:
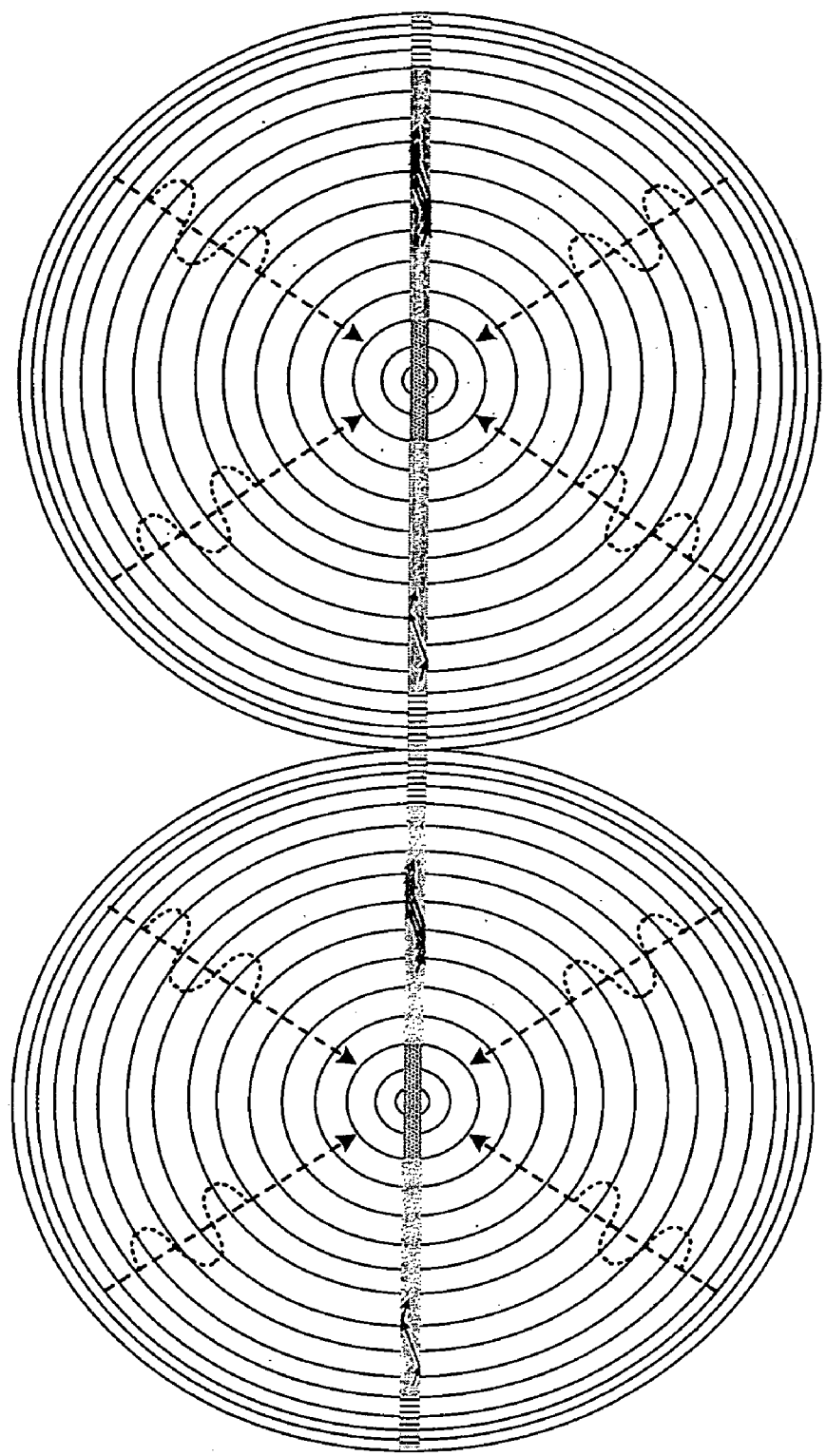
FIG. 5 is a view of the serial connection of the optical amplifiers according to the present invention.

Please refer to FIG. 5, which is a view of a serial connection of the optical amplifiers according to the present invention. Therein, an amplifier can be obtained by serializing the amplifiers as connecting the output of a solar-pumped active device with the input of another solar-pumped active device.

Figure 6:
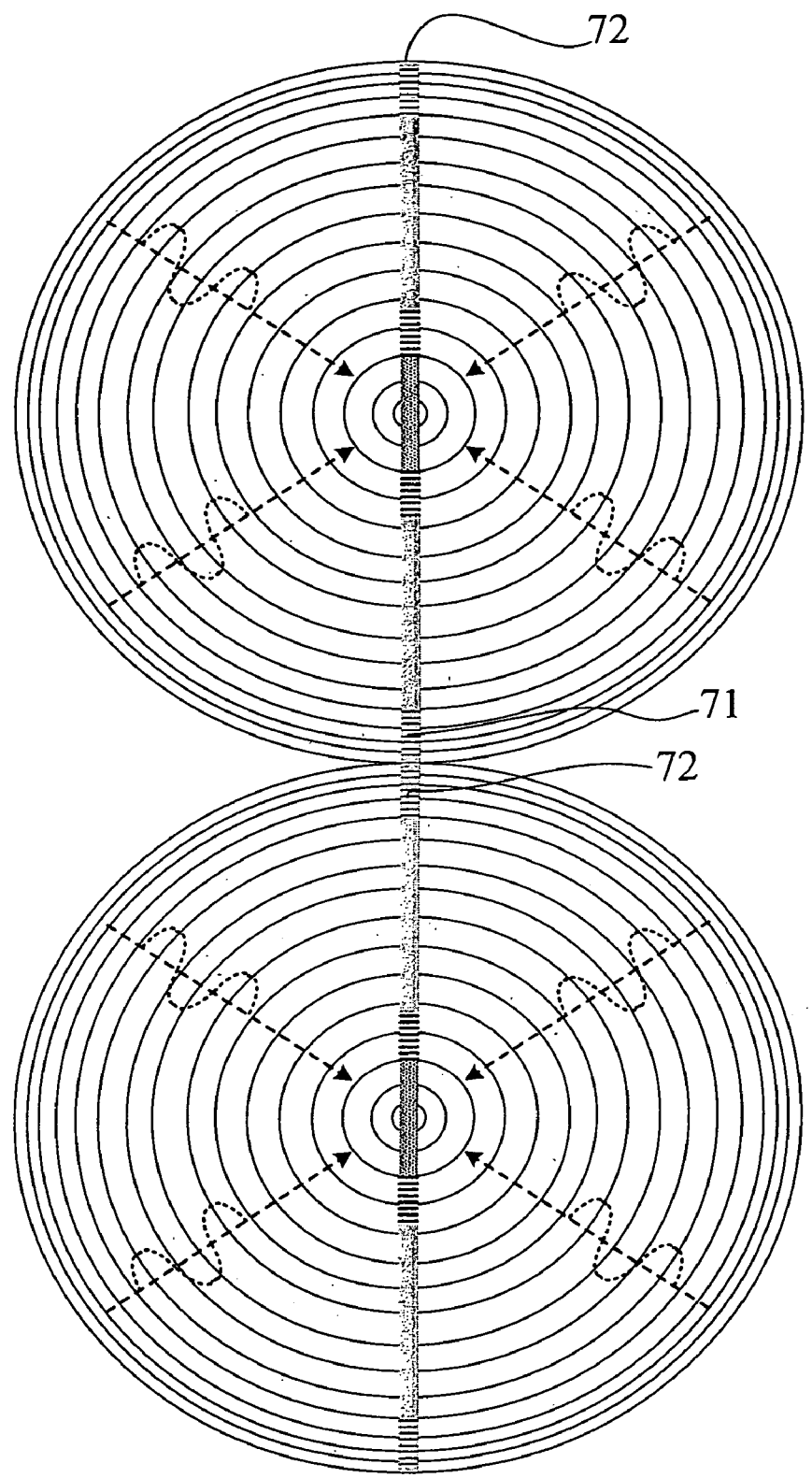
FIG. 6 is a view of the serial connection of the lasers according to the present invention.

Please refer to FIG. 6, which is a view of a serial connection of the laser according to the present invention. Therein, a laser can be obtained by serializing the lasers as connecting the output of a solar-pumped active device with the input of another solar-pumped active device for achieving the effect of.

Figure 7:
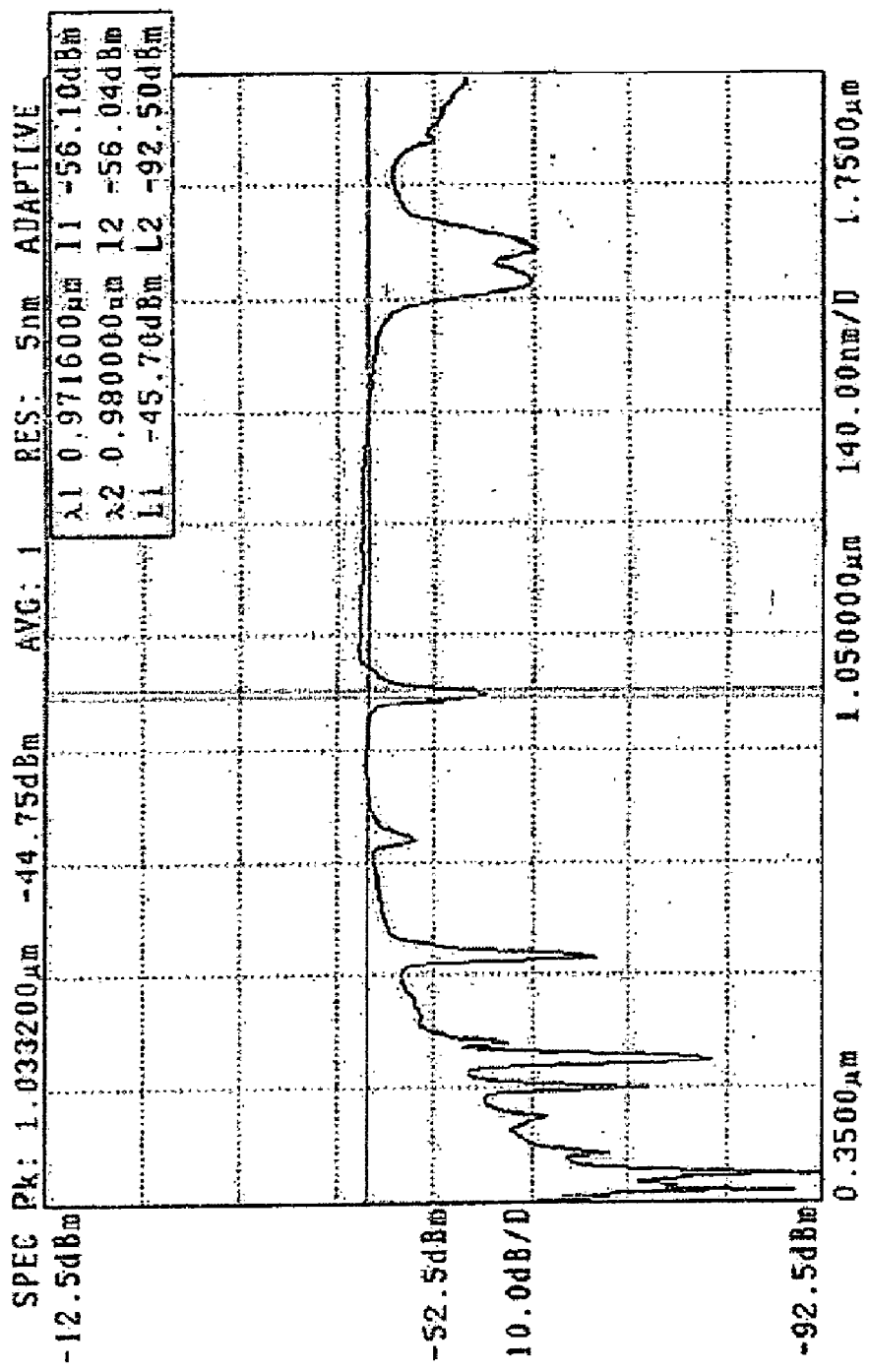
FIG. 7 is a spectrum view showing the absorption of the erbium-doped glass according to the present invention.
Figure 8:
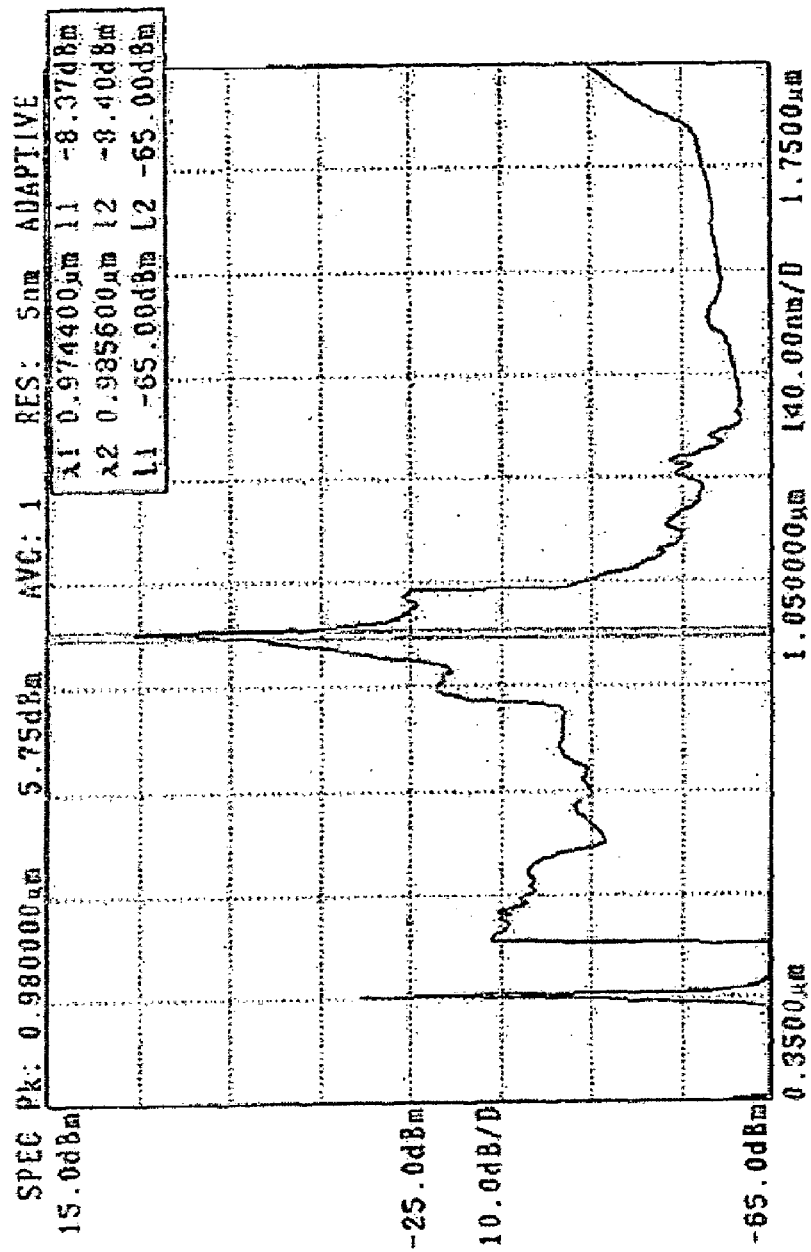
FIG. 8 is a spectrum view of the 980 nm-laser diode according to the present invention, wherein 'nm' stands for 'nanometer'.

Please refer to FIG. 7 and FIG. 8, which are spectrum views showing the absorption of the Er-doped glass and the 980 nm laser diode according to the present invention. As shown in the figures, a spectrum of solar radiation measured by US Naval Research Laboratory is used to obtain a simple estimation:

1. According to the US Naval Research Laboratory, the total power of sunlight on the ground in one square meter is 1366W/m², while 'W' stands for 'watt' and 'm' stands for 'meter'; the energy around exact 980 nm is 887.5 mW/nmZm². The pump wavelength of the sunlight that can excite the optical gain medium 4 is only the wavelength of from 970 nm to 980 nm. (As shown in FIG. 7.) In fact, the wavelength of from 965 nm to 985 nm can be coupled into the waveguide layer 12 in an approximately vertical direction. On considering the above situations, the effective energy of pump wavelength obtained from the sunlight is 887.5 mW/nmZm²× (985–975)=8875 mW/m²=8875×10−4 mW/cm².

2. By using a square-shaped holographic antenna grating 2 with a facet of 30 cm×30 cm, the total power of the pump wavelength absorbed from the sunlight is 8875×10⁻⁴ mW/cm²×30 cm×30 cm=789.75 mW.

3. According to the theory of the holographic antenna grating 2, the maximum diffraction rate is 40%. If the diffraction rate obtained is around 30%, the total power of the pump wavelength received is 789.75 mW×0.3=236.925 mW. In another word, by using a holographic antenna grating 2 with a facet of 30 cm×30 cm, more than 200 mW of 980 nm pump power is obtained, which is the power around exact 980 nm. In addition, the facet of the solar energy cell plate on the satellite has a size of several square meters. Therefore, the practicability of the present invention is for sure.

The power for the commercial 980 nm pump laser is usually expressed with the measurement obtained by an integrating sphere and a power-meter. Therefore, generally, a 980 nm laser with 200 mW does not mean that there is really a power of 200 mW existed around 980 nm; rather, it means an integral of all the spectrum energy. But now, by using a 280 mW of high efficiency 980 nm pump laser, the measurement obtained by the power-meter is really almost 280 mW. However, by using a spectrum analyzer, much power outside of 980 nm can be found. (As shown in FIG. 8.) Therefore, the method used in the present invention for measuring the power of pump wavelength from sunlight is much severer than that which is generally used.

Figure 9:
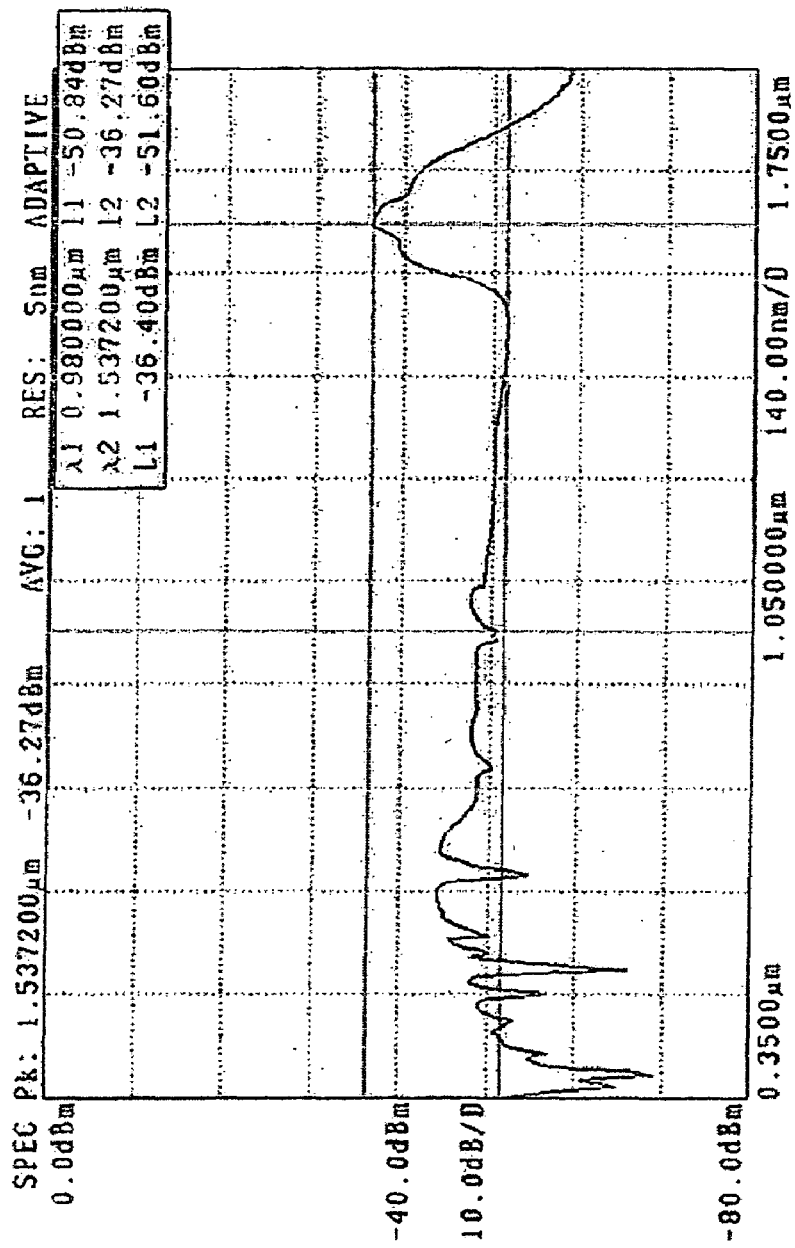
FIG. 9 is a spectrum view showing the gain obtained from the erbium-doped glass waveguide impinged by a halogen light bulb with 250 W (watt) according to the present invention.
Figure 10:
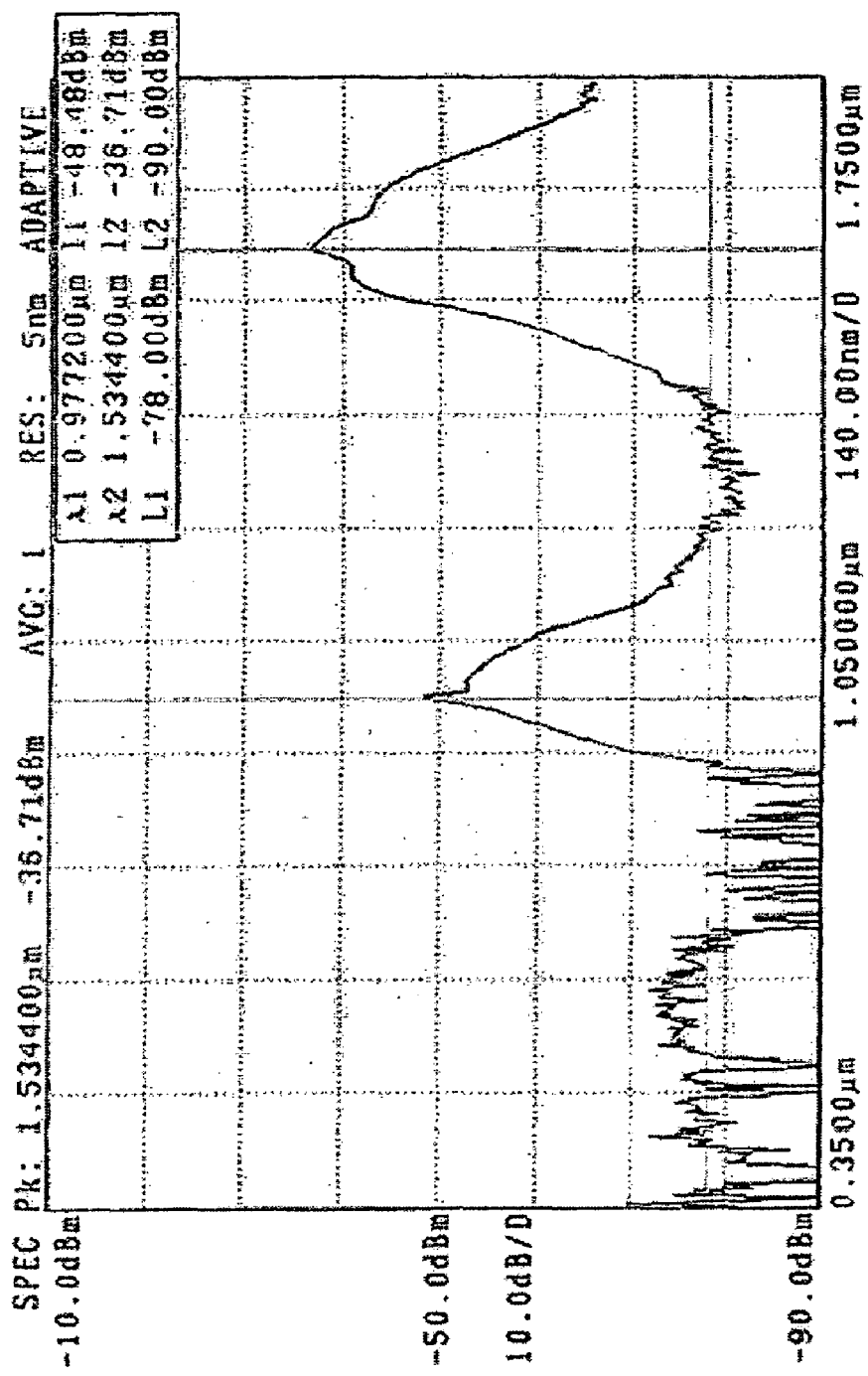
FIG. 10 is a spectrum view showing the gain obtained from the erbium-doped glass waveguide impinged by a 980 nm laser with 280 mW (milli-watt) according to the present invention.

Please refer to FIG. 9 and FIG. 10, which are spectrum views showing the spectra of Amplified Spontaneous Emission (ASE) obtained from the erbium-doped glass waveguide impinged by a 250 W (watt) halogen bulb and by a 980 nm laser with 280 mW, according to the present invention. As shown in the figures, the following is a comparison between the methods of exciting the optical gain medium 4 (i.e. Er-doped glass) on its side with a 250 W halogen bulb (as shown in FIG. 9) and with a 280 mW of 980 nm pump laser (as shown in FIG. 10):

4. By exciting a highly Er-doped glass of a dimension of 20 mm (millimeter) in length and 17 mm in width and 5 mm in height with a 250 W halogen bulb, a spectrum of an ASE from the optical Er-doped fiber amplifier is obtained, as shown in FIG. 9.

5. By using a 280 mW of 980 nm pump laser, a spectrum of an ASE from the optical Er-doped fiber amplifier is obtained, as shown in FIG. 10.

Comparing FIG. 9 with FIG. 10, the 1.53 mm (micrometer) wavelength power can reach the similar level in both figures. In another word, the capacity of a 250 W halogen bulb for exciting the optical gain medium 4 (i.e. Er-doped glass) on its side is similar to that of a 980 nm semiconductor laser of 280 mW. And, the ASE power of the Er-doped amplifier seems very weak. One of the reason is that the ASE power of the optical Er-doped fiber amplifier outputted from the optical gain medium 4 (i.e. Er-doped glass) is not focused into the spectrum analyzer. And, another reason is that the pump wavelength can not fully excite such a big optical gain medium 4 (i.e. Er-doped glass). Yet the comparative result will not be influenced under such a condition. The gain of 1.53 mm wavelength in FIG. 9 seems smaller than that of FIG. 10, which is caused by that more white light is directed in by the halogen bulb to enter into the spectrum analyzer and so the noise level becomes higher. Here, the only concern is on how much power can be generated by the ASE of the Er-doped fiber amplifier, which is related to the pumping ability of the light. If the other wavelengths from the halogen bulb are filtered off, the gain obtained in FIG. 9 can be as much as that in the FIG. 10. In the other hand, the solar energy for one square meter can be assumed as about 1.36 kW (kilowatt). Even though the diffraction efficiency of the holographic antenna grating 2 is only around 30%, a total power of about 450 W can still be obtained, wherein the power is still more than that which is generated by the 250 W halogen bulb. Therefore, by using a holographic diffraction plate with a facet of 50 cm×50 cm only, efficiency like that of a 980 nm pump laser of 280 mW can be achieved successfully.

Figure 11:
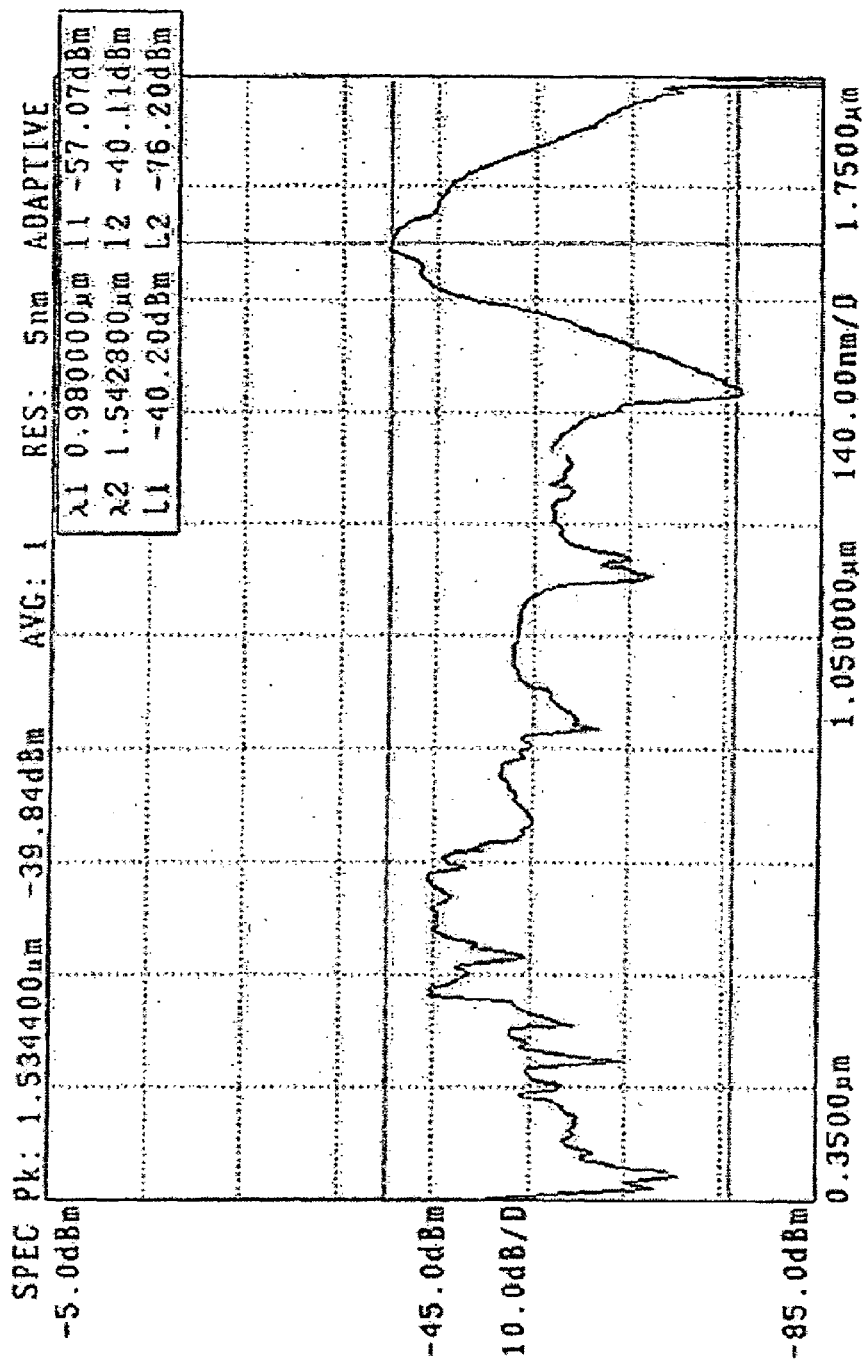
FIG. 11 is a spectrum view showing the gain obtained from the erbium-doped glass waveguide where the sunlight is focused by a Fresnel lens of a square of 30 cm×30 cm according to the present invention, wherein 'cm' stands for 'centimeter'.
Figure 12:
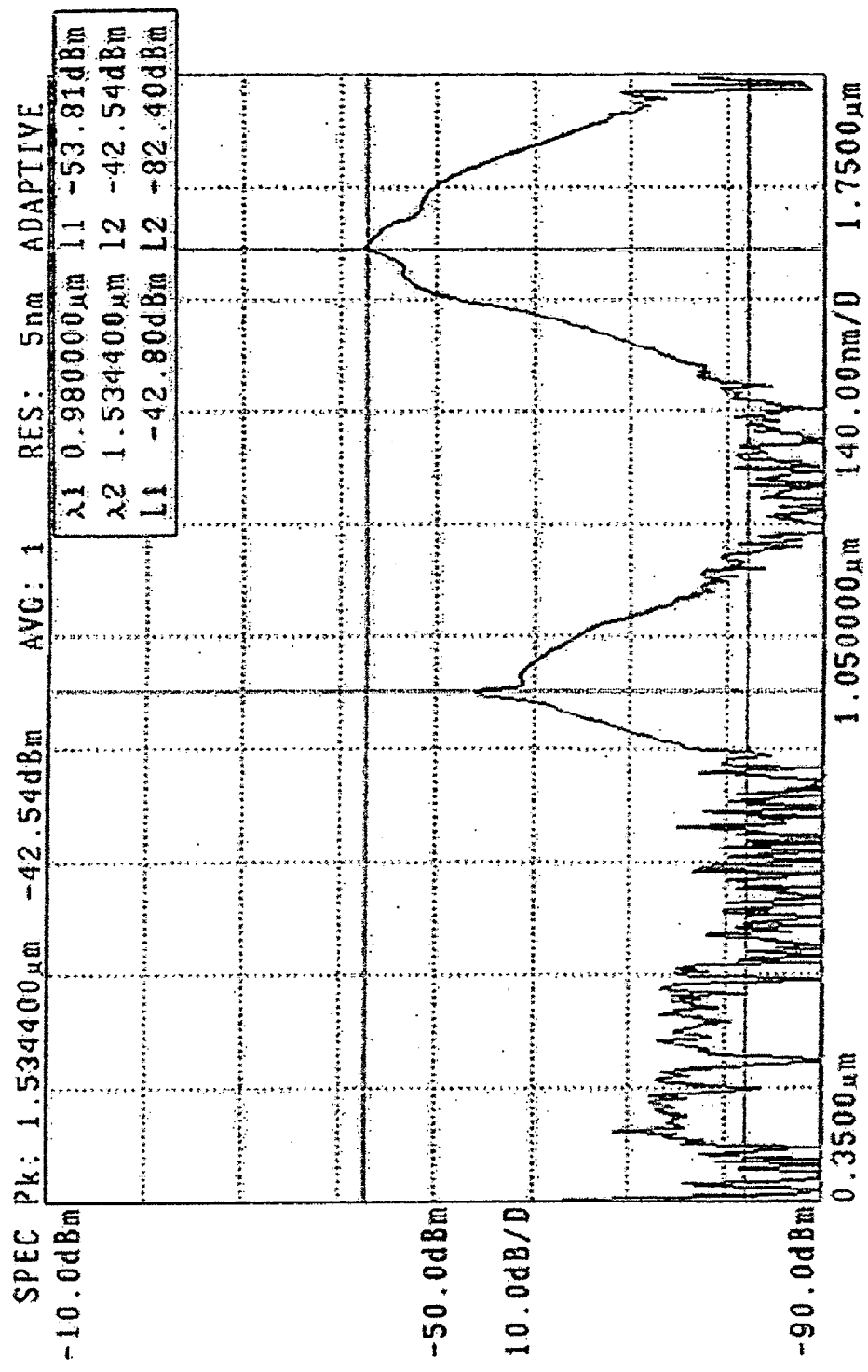
FIG. 12 is a view showing the strength of the sunlight where the current of the 980 nm laser is adjusted to simulate the status of FIG. 11 according to the present invention.

Please refer to FIG. 11 and FIG. 12, which are a spectrum view showing the ASE obtained from the optical gain medium where the sunlight is focused to a Fresnel lens of a square of 30 cm×30 cm and a view showing the strength of the sunlight simulating FIG. 11 by adjusting the current of the 980 nm laser, according to the present invention.

The following is the comparison made between the results of exciting the optical gain medium 4 (i.e. Er-doped glass) by focusing the sunlight and by a 980 nm pump laser of 100 mW:

6. At noon in a sunny day, in a temperature of 30 Celsius degrees, by using a holographic Fresnel-lens focusing plate of acrylic material with a facet of 30 cm'30 cm, the sunlight is focused onto the optical gain medium 4 (i.e. Er-doped glass) on its side. By using the spectrum analyzer to measure the amplification effect of the optical gain medium 4, the optical ASE spectrum is obtained as illustrated in FIG. 11, wherein the stimulated emission and the spontaneous emission are measured directly without using the focusing lens. The power of 1.54 mm wavelength can reach about −40 dBm, wherein the attenuation around 1.4 mm is caused by the absorption of the band gap of the acrylic material.

7. Concerning the 980 nm pump laser under a 206 milli-ampere current, the power is measured as 100 mW by a power-meter. Under the same experimental conditions, by using the power to excite on the sides, the optical gain medium 4 (i.e. Er-doped glass) is excited to obtain ASE spectrum as illustrated in FIG. 12, wherein the ASE power obtained at 1.53 mm is about −42 dBm.

By comparing FIG. 11 with FIG. 12, it can be found that the capacity of a Fresnel zone plate with a facet of 30 cm'30 cm for exciting a optical gain medium 4 (i.e. Er-doped glass) is no smaller than that of a 980 nm pump laser of 100 mW. In addition, when the sunlight is focused onto the optical gain medium 4 (i.e. Er-doped glass), because the light beam is wider than the optical gain medium 4 (i.e. Er-doped glass), not all of the energy is propagated into it. In the other hand, the 980 nm pump laser is propagated through the fiber so that a strong power can be focused and propagated in a smaller area to obtaining a higher excited state population inversion in optical gain medium 4 (i.e. Er-doped glass).

Therefore, by way of focusing the sunlight, the efficiency of the exciting by a high-power 980 nm pump laser can be easily achieved. Therefore, if the solar optical amplifier is widely used, it would carry out a great technique revolution in the field of the optical communications, especially in satellite optical communications and ground wireless optical communications.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

The invention claimed is:

1. A solar-pumped active device, comprising: a substrate; an optical diffraction element; a first optical reflection element; a second optical reflection element; an optical waveguide; an optical gain medium; an output port; an anti-reflection film; and a reflection layer, wherein said substrate is covered with said reflection layer and on said substrate are said first optical reflection element, said optical waveguide, said optical gain medium and said anti-reflection film; wherein the required wavelength in sunlight is coupled by said optical diffraction element on said substrate and said first optical reflection element in said optical waveguide and then said wavelength is converged to said optical gain medium; and wherein, accordingly, a laser is obtained in coordination with said second optical reflection element and is outputted by said output port, wherein said optical diffraction element is a holographic antenna grating.

2. The device according to claim 1, wherein said first optical reflection element is a Bragg grating.

3. The device according to claim 1, wherein said first optical reflection element is a photonic crystal.

4. The device according to claim 1, wherein said second optical reflection element is a laser reflection grating.

5. The device according to claim 1, wherein said second optical reflection element is a photonic crystal.

6. The device according to claim 1, wherein the material of said substrate is selected from the group consisting of a solar energy silicon substrate, a metal, a polymer, a semi-conductor material and a dielectric material.

7. The device according to claim 1, wherein the shape of said holographic antenna grating is selected from the group consisting of a circle and an ellipse.

8. The device according to claim 1, wherein the shape of said holographic antenna grating is a geometric shape.

9. The device according to claim 1, wherein said optical gain medium is an Er-doped glass.

10. The device according to claim 9, wherein said Er-doped glass is radiation-hardened.

11. The device according to claim 9, wherein said Er-doped glass is further Al-doped.

12. The device according to claim 1, wherein said optical gain medium is an Yb-doped material.

13. The device according to claim 12, wherein said Yb-doped material is further Al-doped.

14. The device according to claim 1, wherein said optical gain medium is doped with a rare earth element.

15. The device according to claim 14, wherein said optical gain medium is further B-doped.

16. The device according to claim 14, wherein said optical gain medium is further Ge-doped.

17. The device according to claim 1, wherein said optical gain medium is Er/Yb co-doped.

18. The device according to claim 17, wherein said optical gain medium is further B-doped.

19. The device according to claim 17, wherein said optical gain medium is further Ge-doped.

20. The device according to claim 1, wherein the material dispersion slope of said optical gain medium is higher than that of said optical diffraction element.

21. The device according to claim 1, wherein the host material of said optical gain medium is selected from the group consisting of a phosphate glass, a fluorophosphates glass, a silicate glass and a borate glass.

22. The device according to claim 1, wherein said optical diffraction element is to diffract a pump light.

23. The device according to claim 1, wherein said first optical reflection element is a reflection grating for pump wavelength.

24. A solar-pumped active device, comprising:
a substrate;
an optical diffraction element;
a first optical reflection element;
a second optical reflection element;
an optical waveguide;
an optical gain medium;
an output port; an anti-reflection film; and
a reflection layer, wherein said substrate is covered with said reflection layer and on said substrate are said first optical reflection element, said optical waveguide, said optical gain medium and said anti-reflection film; wherein the required wavelength in sunlight is coupled by said optical diffraction element on said substrate and said first optical reflection element in said optical waveguide and then said wavelength is converged to said optical gain medium; and wherein, accordingly, a laser is obtained in coordination with said second optical reflection element and is outputted by said output port, wherein said first optical reflection element is a photonic crystal.

25. A solar-pumped active device, comprising:
a substrate;
an optical diffraction element;
a first optical reflection element;
a second optical reflection element;
an optical waveguide; an optical gain medium;
an output port; an anti-reflection film; and
a reflection layer, wherein said substrate is covered with said reflection layer and on said substrate are said first optical reflection element, said optical waveguide, said optical gain medium and said anti-reflection film;

wherein the required wavelength in sunlight is coupled by said optical diffraction element on said substrate and said first optical reflection element in said optical waveguide and then said wavelength is converged to said optical gain medium; and wherein, accordingly, a laser is obtained in coordination with said second optical reflection element and is outputted by said output port, wherein said second optical reflection element is a photonic crystal.

26. A solar-pumped active device, comprising:
a substrate;
an optical diffraction element;
a first optical reflection element;
a second optical reflection element;
an optical waveguide;
an optical gain medium;
an output port;
an anti-reflection film; and
a reflection layer, wherein said substrate is covered with said reflection layer and on said substrate are said first optical reflection element, said optical waveguide, said optical gain medium and said anti-reflection film;

wherein the required wavelength in sunlight is coupled by said optical diffraction element on said substrate and said first optical reflection element in said optical waveguide and then said wavelength is converged to said optical gain medium; and wherein, accordingly, a laser is obtained in coordination with said second optical reflection element and is outputted by said output port, wherein said optical gain medium is an Er-doped glass.

27. The device according to claim 26, wherein said Er-doped glass is radiation-hardened.

28. The device according to claim 26, wherein said Er-doped glass is further Al-doped.

29. A solar-pumped active device, comprising:
a substrate;
an optical diffraction element;
a first optical reflection element;
a second optical reflection element;
an optical waveguide;
an optical gain medium;
an output port;
an anti-reflection film; and
a reflection layer, wherein said substrate is covered with said reflection layer and on said substrate are said first optical reflection element, said optical waveguide, said optical gain medium and said anti-reflection film;

wherein the required wavelength in sunlight is coupled by said optical diffraction element on said substrate and said first optical reflection element in said optical waveguide and then said wavelength is converged to said optical gain medium; and wherein, accordingly, a laser is obtained in coordination with said second optical reflection element and is outputted by said output port, wherein said optical gain medium is selected from the group consisting of an Er-doped glass and an Er/Yb-doped material; wherein said optical gain medium is B-doped; and wherein said optical diffraction element is an F-doped holographic grating layer.

* * * * *